US006255665B1

(12) United States Patent
Elgee et al.

(10) Patent No.: US 6,255,665 B1
(45) Date of Patent: Jul. 3, 2001

(54) PRINT MEDIA AND METHOD OF DETECTING A CHARACTERISTIC OF A SUBSTRATE OF PRINT MEDIA USED IN A PRINTING DEVICE

(75) Inventors: Steven B. Elgee, Portland, OR (US); Carmalyn Lubawy, Vancouver, WA (US); Bruce E. Mortland, Oceanside, CA (US); Craig S. Huston, Escondido, CA (US); Said Zamani-Kord, San Diego, CA (US); Dale R Davis, Poway, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/240,947

(22) Filed: Jan. 29, 1999

(51) Int. Cl.[7] .................................................... G01N 21/86

(52) U.S. Cl. .................................. 250/559.4; 250/559.44

(58) Field of Search .................................. 250/234, 235, 250/559.3, 559.4, 559.42, 559.44

(56) References Cited

U.S. PATENT DOCUMENTS

| | | | |
|---|---|---|---|
| 3,105,908 | 10/1963 | Burkhardt et al. . | |
| 3,525,872 | 8/1970 | Schneider . | |
| 3,599,389 | 8/1971 | Hartman . | |
| 4,340,663 | 7/1982 | Mikawa et al. | 430/496 |
| 4,467,207 | 8/1984 | Lerner et al. . | |
| 4,503,323 | 3/1985 | Flam | 235/489 |
| 4,641,019 | 2/1987 | Inatsuki | 250/201 |
| 4,680,205 | 7/1987 | Lerner et al. . | |
| 4,708,901 | 11/1987 | Wood . | |
| 4,716,438 | 12/1987 | Farrell . | |
| 4,734,868 | 3/1988 | DeLacy | 364/519 |
| 4,777,108 | 10/1988 | Adair . | |
| 4,865,478 | 9/1989 | Chan et al. | 400/616.3 |
| 4,916,638 | 4/1990 | Haselby et al. | 364/519 |
| 4,922,270 | 5/1990 | Cobbs et al. . | |
| 4,944,031 | 7/1990 | Yoshino et al. . | |
| 4,969,013 | 11/1990 | Tsilibes . | |
| 5,252,991 | 10/1993 | Storlie et al. | 346/108 |
| 5,397,192 | 3/1995 | Khormaee . | |
| 5,444,469 | 8/1995 | Cowger | 347/14 |
| 5,466,079 | 11/1995 | Quintana . | |
| 5,484,994 | 1/1996 | Roustaei . | |
| 5,503,904 | 4/1996 | Yoshinaga et al. . | |
| 5,523,562 | 6/1996 | Maple . | |

(List continued on next page.)

FOREIGN PATENT DOCUMENTS

| | | |
|---|---|---|
| 0 884 195 | 12/1998 | (EP) . |
| 63-120648 | 5/1988 | (JP) . |
| 63-216769 | 9/1988 | (JP) . |
| 02084368 | 3/1990 | (JP) . |
| 02263674 | 10/1990 | (JP) . |

*Primary Examiner*—Que T. Le
(74) *Attorney, Agent, or Firm*—Erik A. Anderson

(57) ABSTRACT

A print medium with encoded data and a print media detection system for use in detecting at least one characteristic of the sheet of print medium based on the encoded data are disclosed. The encoded data is designed to minimize its visual perceptibility. The print media detector is designed to recognize various characteristics of print media based upon the encoded data and transmit information regarding these characteristics to a printing device so that one or more operating parameters of the printing device can be adjusted to help optimize print quality for the particular characteristics of a particular print medium. A printing device including the print medium and print media detection system is also disclosed. A method of detecting one or more characteristics of print media used in a printing device is additionally disclosed. Further characteristics and features of the print medium, print media detection system, printing device, and method are described herein, as are examples of various alternative embodiments.

37 Claims, 8 Drawing Sheets

U.S. PATENT DOCUMENTS

| | | | | |
|---|---|---|---|---|
| 5,563,686 | | 10/1996 | Beaufort et al. . | |
| 5,564,848 | | 10/1996 | Quintana . | |
| 5,568,172 | | 10/1996 | Cowger | 347/19 |
| 5,668,363 | | 9/1997 | Nishida et al. . | |
| 5,770,841 | | 6/1998 | Moed et al. . | |
| 5,774,146 | | 6/1998 | Mizutani . | |
| 5,821,523 | | 10/1998 | Bunte et al. . | |
| 5,877,486 | | 3/1999 | Maltsev et al. . | |
| 5,880,176 | | 3/1999 | Kamoto et al. . | |
| 6,028,320 | * | 2/2000 | Uhling | 250/559.44 |

* cited by examiner

PRINT MEDIA AND METHOD OF DETECTING A CHARACTERISTIC OF A SUBSTRATE OF PRINT MEDIA USED IN A PRINTING DEVICE

BACKGROUND AND SUMMARY

The present invention relates to printing devices. More particularly, the present invention relates to a print medium, detection system, and method for use in printing devices.

Printing devices, such as inkjet printers, use printing composition (e.g., ink or toner) to print text, graphics, images, etc. onto print media. The print media may be of any of a variety of different types. For example, the print media may include paper, transparencies, envelops, photographic print stock, cloth, etc. Each of these types of print media have various characteristics that ideally should be accounted for during printing, otherwise a less than optimal printed output may occur. Additional characteristics may also affect print quality, including print medium size and print medium orientation.

One way in which a printing device can be configured to a particular print medium is to have a user make manual adjustments to the printing device based upon these characteristics and factors. One problem with this approach is that it requires user intervention which is undesirable. Another problem with this approach is that it requires a user to correctly identify various characteristics of a particular print medium. A further problem with this approach is that a user may choose not to manually configure the printing device or may incorrectly manually configure the printing device so that optimal printing still does not occur in spite of user intervention. This can be time-consuming and expensive depending on when the configuration error is detected and the cost of the particular print medium.

Automatic detection of the different characteristics of various print media used in printing devices would be a welcome improvement. Accordingly, the present invention is directed to alleviating these above-described problems and is designed to help optimize printing on a variety of different types of print media under a variety of operating conditions and user inputs. The present invention accomplishes this without degrading output print quality of the printing device.

An embodiment of a print medium in accordance with the present invention for use in a printing device includes a substrate that is configured to receive a printing composition from the printing device. The substrate includes a first surface and has at least one characteristic. The first surface of the substrate is configured to receive the printing composition from the printing device during printing. The substrate is further configured to define at least one aperture that has a geometry configured to encode data representative of the at least one characteristic of the first surface.

The above-described print medium may be modified and include the following characteristics described below. The geometry may be configured to help minimize visual perceptibility of the at least one aperture. The geometry may include a substantially circular opening, a substantially rectangular opening, a substantially triangular opening, or a substantially elliptical opening. The substantially circular opening may have a diameter substantially within a range between 0.001 inches and 0.008 inches.

The substrate may include an edge and the substrate may define the at least one aperture adjacent the edge. The substrate may define the at least one aperture in a predetermined location on the print medium. In such cases, the location of the aperture encodes additional data representative of the characteristic of the first surface.

The substrate may define at least two apertures arranged in a pattern that encodes additional data representative of the at least one characteristic of the first surface. The print medium may be used in a printing device and may also be used in a print media detection system.

An alternative embodiment of a print medium in accordance with the present invention for use in a printing device includes a substrate configured to receive a printing composition from the printing device. The substrate includes a first surface and a plurality of corners defined by intersecting edges of the substrate. The first surface of the substrate is configured to receive the printing composition from the printing device during printing. The first surface of the substrate has at least one characteristic and the substrate is further configured to define a plurality of sets of apertures. At least one set of apertures is positioned adjacent each of the corners and one set of apertures has a configuration indicative of the at least one characteristic of the substrate.

The above-described alternative embodiment of a print medium in accordance with the present invention may be modified and include the following characteristics described below. The configuration may include a pattern that encodes data representative of the characteristic of the first surface. This configuration may include a geometry that encodes data representative of the characteristic of the first surface.

The sets of apertures may include a substantially circular opening, a substantially rectangular opening, a substantially triangular opening, or a substantially elliptical opening. The substantially circular opening may have a diameter substantially within a range between 0.001 inches and 0.008 inches.

The apertures may be configured to help minimize visual perceptibility. The print medium may be used in a printing device and may also be used in a print media detection system.

An embodiment of a print media detection system in accordance with the present invention for use in a printing device includes a source, sensor, controller, and substrate. The source is configured to transmit a light signal and the sensor is configured to detect the light signal from the source and convert the light signal into an electrical signal. The controller is coupled to the sensor and is configured to receive the electrical signal from the sensor. Based at least in part on the electrical signal, the controller controls an operating parameter of the printing device. The substrate is configured to receive a printing composition from the printing device. The substrate has at least one characteristic and the substrate is further configured to define a plurality of apertures. The apertures each have a geometry selected to allow the light signal to travel from the source through the apertures to the sensor. The apertures are arranged in a pattern that encodes data representative of the characteristic of the substrate.

The above-described print media detection system may be modified and include the following characteristics described below. The geometry of each of the apertures may be configured to help minimize visual perceptibility of the apertures. The geometry may include at least one substantially circular opening, at least one substantially rectangular opening, at least one substantially triangular opening, or at least one substantially elliptical opening. The substantially circular opening may have a diameter substantially within a range between 0.001 inches and 0.008 inches.

The plurality of apertures may be in a predetermined location on the substrate. In such embodiments, the location of the apertures encodes additional data representative of the at least one characteristic of the first surface. The media detection system may be used in a printing device.

An alternative embodiment of a print media detection system in accordance with the present invention for use in a printing device includes structure for transmitting a light signal and structure for sensing the light signal and converting the light signal into an electrical signal. The print media detection system also includes structure, coupled to the detecting structure, for controlling an operating parameter of the printing device based at least in part on the electrical signal received from the detecting structure. The print media detection system additionally includes structure for receiving printing composition from the printing device. The structure for receiving printing composition has at least one characteristic and defines structure for encoding data representative of the characteristic.

The above-described alternative embodiment of a print media detection system in accordance with the present invention may be modified and include the following characteristics described below. The structure for receiving printing composition may include a substrate having a first surface. The first surface of the substrate is configured to receive the printing composition from the printing device during printing and the first surface of the substrate has at least one characteristic. The structure for encoding data representative of the characteristic includes at least one aperture through which the light signal from the structure for transmitting passes to the structure for sensing.

The structure for receiving printing composition may include a substrate and the structure for encoding data representative of the characteristic may include a plurality of apertures. The apertures each have a geometry selected to allow the light signal from the structure for transmitting to travel from the structure for transmitting through the apertures to the structure for sensing. The apertures are arranged in a pattern that encodes data representative of the characteristic of the substrate.

The print media detection system may be used in a printing device.

An embodiment of a method of detecting a characteristic of a substrate of print medium used in a printing device, having at least one characteristic and being configured to receive a printing composition from the printing device, in accordance with the present invention includes encoding data into the substrate of print medium, the data representing the at least one characteristic of the substrate of print medium. The method also includes transmitting a light signal through the encoded data in the substrate of print medium and detecting the light signal subsequent to transmission through the encoded data in the substrate of print medium. The method additionally includes converting the detected light signal into an electrical signal, the electrical signal having a pattern representative of the characteristic of the print medium. The method further includes controlling an operating parameter of the printing device based at least in part on the electrical signal.

The above-described method in accordance with the present invention may be modified and include the following characteristics described below. The data may be encoded into the substrate as at least one aperture. The method may also include configuring a geometry of the at least one aperture to encode data representative of the characteristic of the substrate of print medium. The at least one aperture may include a substantially circular opening, a substantially rectangular opening, a substantially triangular opening, or a substantially elliptical opening. The substantially circular opening may have a diameter substantially within a range between 0.001 inches and 0.008 inches. The method may additionally include configuring the geometry of the at least one aperture to help minimize visual perceptibility of the at least one aperture.

The data may be encoded into the substrate as a plurality of apertures. The method may also include configuring a geometry of the apertures to encode data representative of the characteristic of the substrate of print medium. The method may additionally include arranging the apertures in a pattern that encodes additional data representative of the characteristic of the substrate. The geometry may include at least one substantially circular opening. The substantially circular opening may have a diameter substantially within a range between 0.001 inches and 0.008 inches. The method may further include configuring the geometry of the apertures to help minimize visual perceptibility of the apertures.

Other objects, advantages, and novel features of the present invention will become apparent from the following detailed description of the invention when considered in conjunction with the accompanying drawings.

DETAILED DESCRIPTION OF THE DRAWINGS

Figure 1:
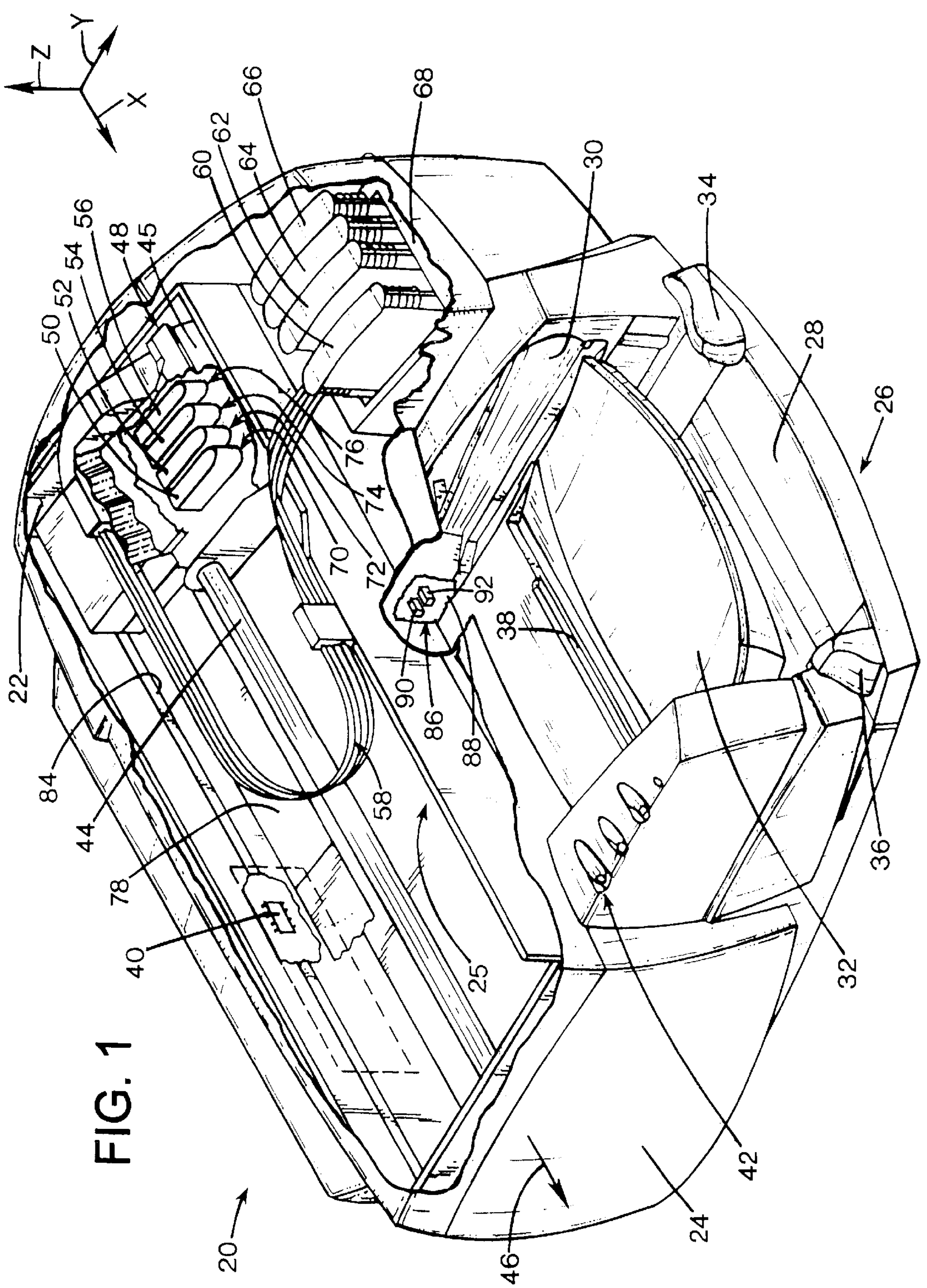
FIG. 1 is a front perspective view of a printing device that includes an embodiment of the present invention.

FIG. 1 illustrates an embodiment of an inkjet printing device 20, here shown as an “off-axis” inkjet printer, constructed in accordance with the present invention, which may be used for printing business reports, correspondence, desktop publishing, and the like, in an industrial, office, home or other environment. A variety of inkjet printing devices are commercially available. For instance, some of the printing devices that may embody the present invention include plotters, portable printing units, copiers, cameras, video printers, and facsimile machines, to name a few, as well as various combination devices, such as a combination facsimile and printer. For convenience, the concepts of the present invention are illustrated in the environment of inkjet printer 20.

While it is apparent that the printing device components may vary from model to model, the typical inkjet printer 20 includes a frame or chassis 22 surrounded by a housing, casing or enclosure 24, typically made of a plastic material. Sheets of print media are fed through a printzone 25 by a print media handling system 26. The print media may be any type of suitable material, such as paper, card-stock, transparencies, photographic paper, fabric, mylar, metalized media, and the like, but for convenience, the illustrated embodiment is described using paper as the print medium. Print media handling system 26 has an input supply feed tray 28 for storing sheets of print media before printing. A series of conventional print media drive rollers (not shown in FIG. 1) driven by a direct current (dc) motor and drive gear assembly (not shown) may be used to move the print media from the feed tray 28, through the printzone 25, and, after printing, onto a pair of extended output drying wing members 30, shown in a retracted or rest position in FIG. 1. Wings 30 momentarily hold a newly printed sheet of print media above any previously printed sheets still drying in an output tray portion 32, then wings 30 retract to the sides to drop the newly printed sheet into the output tray 32. Media handling system 26 may include a series of adjustment mechanisms for accommodating different sizes of print media, including letter, legal, A-4, envelopes, etc., such as a sliding length adjustment lever 34, a sliding width adjustment lever 36, and an envelope feed port 38. Although not shown, it is to be understood that media handling system 26 may also include other items such as one or more additional print media feed trays. Additionally, media handling system 26 and printing device 20 may be configured to support specific printing tasks such as duplex printing and banner printing.

Printing device 20 also has a printer controller 40, illustrated schematically as a microprocessor, that receives instructions from a host device, typically a computer, such as a personal computer (not shown). Many of the printer controller functions may be performed by the host computer, including any printing device drivers resident on the host computer, by electronics on board the printer, or by interactions between the host computer and the electronics. As used herein, the term "printer controller 40" encompasses these functions, whether performed by the host computer, the printer, an intermediary device between the host computer and printer, or by combined interaction of such elements. Printer controller 40 may also operate in response to user inputs provided through a key pad 42 located on the exterior of the casing 24. A monitor (not shown) coupled to the computer host may be used to display visual information to an operator, such as the printer status or a particular program being run on the host computer. Personal computers, their input devices, such as a keyboard and/or a mouse device, and monitors are all well known to those skilled in the art.

A carriage guide rod 44 is supported by chassis 22 to slidably support an off-axis inkjet pen carriage system 45 for travel back and forth across printzone 25 along a scanning axis 46. As can be seen in FIG. 1, scanning axis 46 is substantially parallel to the X-axis of the XYZ coordinate system shown in FIG. 1. Carriage 45 is also propelled along guide rod 44 into a servicing region, as indicated generally by arrow 48, located within the interior of housing 24. A conventional carriage drive gear and dc (direct current) motor assembly (both of which are not shown) may be coupled to drive an endless loop, which may be secured in a conventional manner to carriage 45, with the dc motor operating in response to control signals received from controller 40 to incrementally advance carriage 45 along guide rod 44 in response to rotation of the dc motor.

In printzone 25, the media sheet receives ink from an inkjet cartridge, such as a black ink cartridge 50 and three monochrome color ink cartridges 52, 54 and 56. Cartridges 50, 52, 54, and 56 are also often called "pens" by those in the art. Pens 50, 52, 54, and 56 each include small reservoirs for storing a supply of ink in what is known as an "off-axis" ink delivery system, which is in contrast to a replaceable ink cartridge system where each pen has a reservoir that carries the entire ink supply as the printhead reciprocates over printzone 25 along the scan axis 46. The replaceable ink cartridge system may be considered as an "on-axis" system, whereas systems which store the main ink supply at a stationary location remote from the printzone scanning axis are called "off-axis" systems. It should be noted that the present invention is operable in both off-axis and on-axis systems.

In the illustrated off-axis printer 20, ink of each color for each printhead is delivered via a conduit or tubing system 58 from a group of main ink reservoirs 60, 62, 64, and 66 to the on-board reservoirs of respective pens 50, 52, 54, and 56. Stationary ink reservoirs 60, 62, 64, and 66 are replaceable ink supplies stored in a receptacle 68 supported by printer chassis 22. Each of pens 50, 52, 54, and 56 has a respective printhead, as generally indicated by arrows 70, 72, 74, and 76, which selectively ejects ink to from an image on a sheet of media in printzone 25.

Printheads 70, 72, 74, and 76 each have an orifice plate with a plurality of nozzles formed therethrough in a manner well known to those skilled in the art. The illustrated printheads 70, 72, 74, and 76 are thermal inkjet printheads, although other types of printheads may be used, such as piezoelectric printheads. Thermal printheads 70, 72, 74, and 76 typically include a plurality of resistors which are associated with the nozzles. Upon energizing a selected resistor, a bubble of gas is formed which ejects a droplet of ink from the nozzle onto a sheet of print media in printzone 25 under the nozzle. The printhead resistors are selectively energized in response to firing command control signals delivered by a multi-conductor strip 78 (a portion of which is shown in FIG. 1) from the controller 40 to printhead carriage 45.

To provide carriage positional feedback information to printer controller 40, a conventional optical encoder strip 84 extends along the length of the printzone 25 and over the service station area 48, with a conventional optical encoder reader being mounted on a back surface of printhead carriage 45 to read positional information provided by encoder strip 84. Printer 20 uses optical encoder strip 84 and optical encoder reader (not shown) to trigger the firing of printheads 70, 72, 74, and 76, as well as to provide feedback for position and velocity of carriage 45. Optical encoder strip 84 may be made from things such as photo imaged MYLAR brand film, and works with a light source and a light detector (both of which are not shown) of the optical encoder reader. The light source directs light through strip 84 which is received by the light detector and converted into an electrical signal which is used by controller 40 of printing device 20 to control firing of printheads 70, 72, 74, and 76, as well as carriage 45 position and velocity. Markings or indicia on encoder strip 84 periodically block this light from the light detector in a predetermined manner which results in a corresponding change in the electrical signal from the detector. The manner of providing positional feedback information via optical encoder reader may be accomplished in a variety of different ways known to those skilled in the art.

An embodiment of a print media detector 86 constructed in accordance with the present invention is attached to sidewall 88 of print media handling system 26. As discussed more fully below, print media detector 86 is positioned in or adjacent the print media path to read encoded data regarding one or more characteristics of a print medium prior to printing on the print medium by pens 70, 72, 74, and 76. As can be seen in FIG. 1, print media detector 86 includes a source 90 configured to transmit a light signal and a sensor 92 configured to detect the light signal from source 90 and convert the light signal into an electrical signal. Sensor 92 is coupled to controller 40 and controller 40 is configured to receive the electrical signal from sensor 92 and, based at least in part on this electrical signal, control one or more operating parameters of printing device 20.

Figure 2:
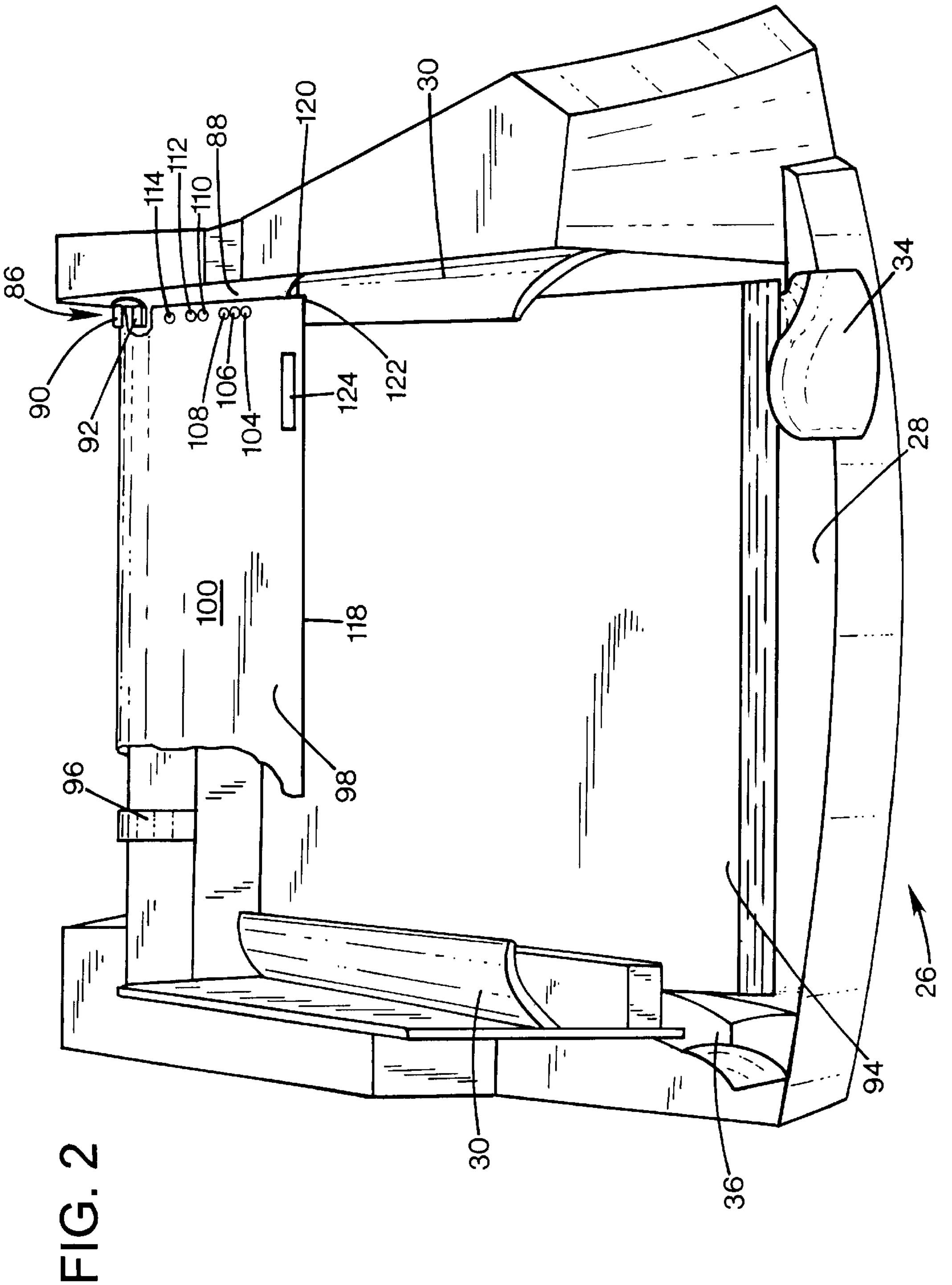
FIG. 2 is a front, top view of a print media handing system of the printing device shown in FIG. 1 and an embodiment of a print media detector of the present invention, also shown in FIG. 1, with a partial sheet of print media of the present invention.

A front, top perspective view of print media handing system 26 of printing device 20 and print media detector 86 are shown in FIG. 2. A stack of print media 94 is loaded in input supply feed tray 28 and aligned via sliding length adjustment lever 34 and sliding width adjustment lever 36. Print media feed rollers 96, only one of which is shown, are designed to select a single sheet of print media 98 from stack 94 and transport sheet 98 to printzone 25 for printing on first surface 100 of the substrate of sheet 98 by one or more of pens 50, 52, 54, and 56. This is know as "picking" by those skilled in the art. Print media feed rollers 96 are mounted on a shaft 102 (see FIG. 3) which is driven by motor (not shown). This motor is controlled by printer controller 40. As can be seen in FIG. 2, output drying wing members 30 support print media sheet 98 as it travels through printzone 25 during printing, as well as subsequent to printing to allow for drying, as discussed above.

A user may desire to produce a variety of different printed outputs with printing device 20. For example, a user may want to produce letters, envelopes, glossy-finish photographs, overhead transparencies, etc. Each of these printed outputs resides on a different print medium. Each of these types of print media have various characteristics such as surface finish, dry time, print medium size, print medium orientation, etc. that ideally should be accounted for during printing, otherwise a less than optimal printed output may occur.

One way in which printing device 20 can be configured to a particular print medium is to have a user make manual adjustments to the printing device based upon these characteristics through, for example, keypad 42 and/or a computer (not shown) attached to printing device 20. One problem with this approach is that it requires user intervention which is undesirable. Another problem with this approach is that it requires a user to correctly identify various characteristics of a particular print medium. A further problem with this approach is that a user may choose not to manually configure the printing device or may incorrectly manually configure printing device 20 so that optimal printing still does not occur in spite of user intervention. This can be time-consuming and expensive depending on when the configuration error is detected and the cost of the print medium.

Figure 3:
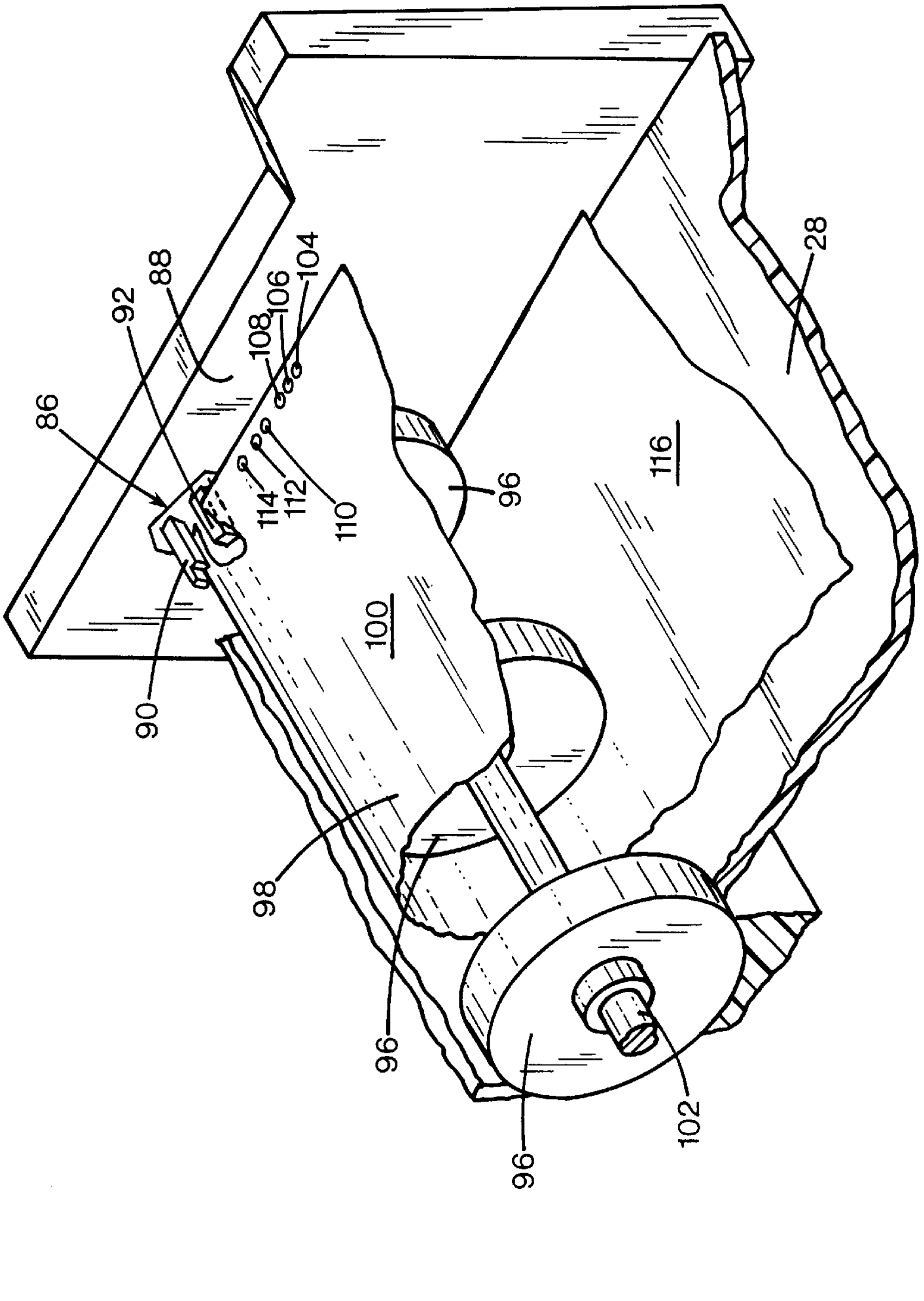
FIG. 3 is a front perspective view of the print media handling system, print media detector, and partial sheet of print media shown in FIG. 2.

As can be seen in FIG. 2, sheet 98 is configured to define a set of apertures 104, 106, 108, 110, 112, and 114 that extend between first surface 100 and second surface 116 (see FIG. 3). Apertures 104, 106, 108, 110, 112, and 114 have a geometry configured to encode data representative of one or more characteristics of sheet of print media 98. As noted above, these characteristics include a variety of things such as the type of print media (e.g. paper, transparencies, envelops, photographic print stock, cloth, etc.), print medium size, print medium dry time, proper print medium orientation in input supply feed tray 28 or envelope feed port 38, and optimal printing device driver selection which may vary with different types of print media.

The geometry includes things such as the shape of the apertures (e.g., substantially circular, rectangular, triangular, elliptical, etc.), the dimensions of the apertures, and the positions of the apertures relative to one another (i.e., patterns formed by apertures 104, 106, 108, 110, 112, and 114), as well as the positions of apertures 104, 106, 108, 110, 112, and 114 on print media sheet 98 (e.g., the positions of apertures 104, 106, 108, 110, 112, and 114 relative to intersecting edges 118 and 120 of sheet 98 which define corner 122). It should be noted that the use of the word substantially in this document is used to account for things such as engineering and manufacturing tolerances, as well as variations not affecting performance of the present invention. It should also be noted that "aperture" as used herein is not limited to a physical opening, such as a hole, in print media. Rather, "aperture" as used herein means an opening or structure defined by a sheet of print media that allows a light signal to substantially pass through the sheet of print media between the first and second surfaces of the sheet of print media.

Unlike barcodes or computer punch cards, the size of apertures 104, 106, 108, 110, 112, and 114 is designed to minimize or eliminate visual perceptibility. In fact, the size of apertures 104, 106, 108, 110, 112, and 114, as well as all others shown in the additional drawings, is enlarged so that the apertures may be seen and discussed. In actual embodiments of the present invention, the apertures defined by sheets of print medium are specifically designed to minimize or eliminate visual perceptibility so that output print quality of printing device 20 is not degraded. For example, in one embodiment of the present invention, apertures, such as apertures 104, 106, 108, 110, 112, and 114, are configured to be substantially circular and each have a diameter substantially within a range of between 0.001 inches and 0.008 inches.

Thus, the present invention automatically detects different characteristics of various print media used in printing devices to help optimize output print quality of printing device 20. The present invention also saves user time and money by eliminating time-consuming and expensive trial and errors to obtain such output print quality. The present invention accomplishes this without degrading output print quality of the printing device by minimizing or eliminating visual perceptibility of the encoded data.

Apertures 104, 106, 108, 110, 112, and 114 defined by print media sheet 98, as well as other apertures in accordance with the present invention, may be placed in sheets of print media during manufacture of the print medium or afterwards as, for example, part of a sizing or branding process. One way in which the apertures may be created is through the use of a rotary chem-milled die and anvil tooling process. A different die can be used for each type or size of print media.

A second way in which apertures may be created is through the use of a computer controlled laser drill. Changes in aperture shape or location are effected via changes in the program controlling the laser. With laser drilling, special attention to aperture shape and dimensions may be necessary for thicker print media.

A third way in which apertures may be created is though the use of a chemical, such as ink, that is placed on print media sheet 98 where apertures are to be defined by the print media sheet. Such a chemical has a refractive index that substantially matches that of the material fibers of print media sheet 98 such that light signals directed toward the sheet where the ink is present are transmitted through it rather than being reflected from either the first or second surface.

A fourth way in which apertures may be created is though the use of steam and pressure directed to specific areas of print media sheet 98 where apertures are to be defined by the print media sheet. Such directed steam and pressure makes those areas of the print media sheet translucent such that light signals directed toward the translucent areas are transmitted through them, rather than being reflected from either the first or second surface Referring again to FIG. 2, an additional set of apertures 124 defined by print media sheet 98 is generally represented by a rectangle. Set of apertures 124 extends between first surface 100 and second surface 116 (see FIG. 3) of print media sheet 98. Although not shown, it is to be understood that up to six additional sets of apertures may be defined by print media sheet 98, two sets at each of the three additional corners, as shown below in connection with FIGS. 4, 6, and 8.

Figure 4:
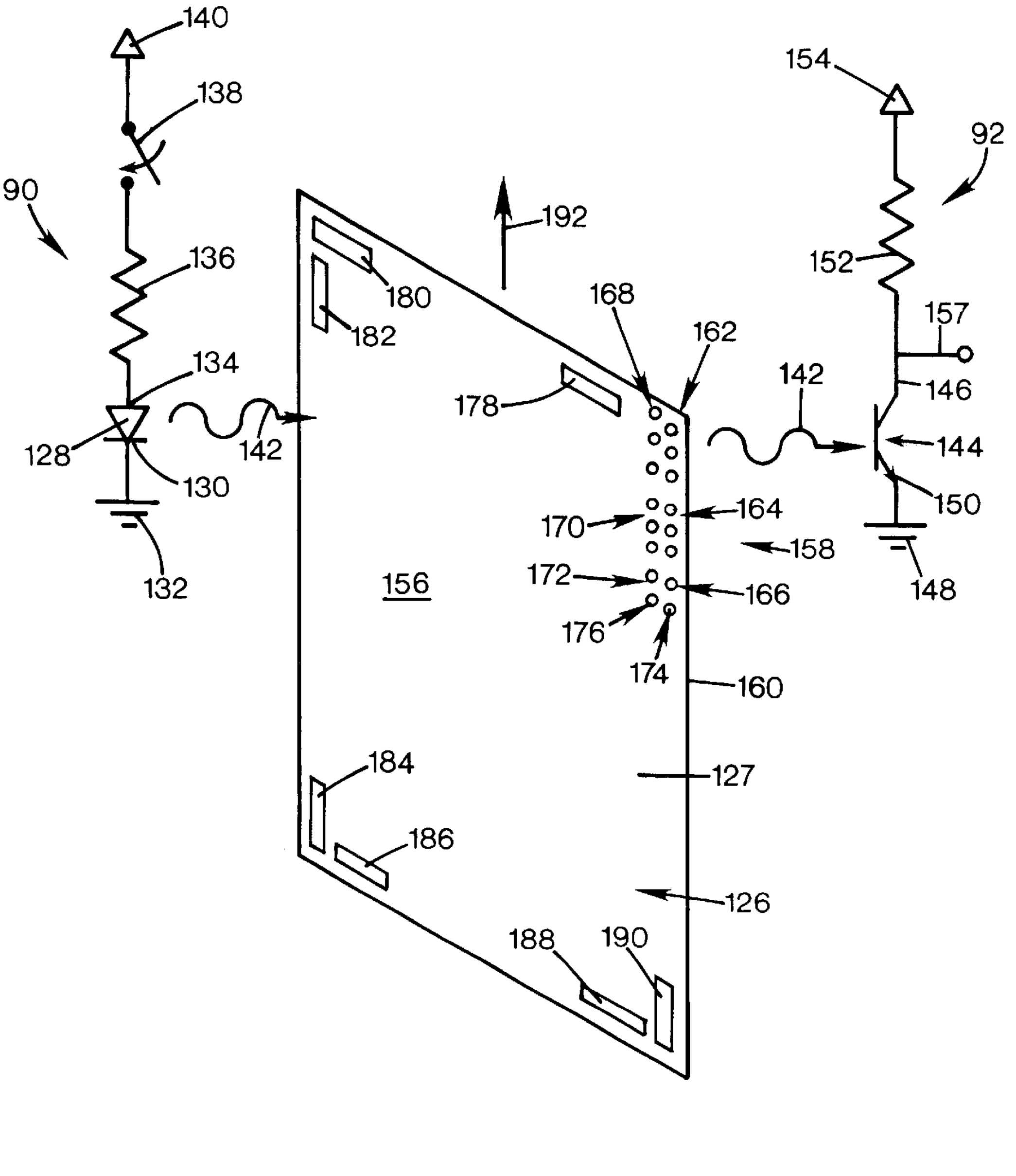
FIG. 4 is a schematic diagram of a print media detector of the present invention in use with a sheet of print media of the present invention.

A schematic diagram of source 90 and sensor 92 of print media detector 86 in use with a sheet of print media 126 is shown in FIG. 4. As can be seen in FIG. 4, source 90 includes a light emitting diode (LED) 128 having a cathode 130 electrically connected to ground 132 and an anode 134 electrically connected to a current limiting resistor 136. Current limiting resistor 136 is also electrically connected to a switch 138 that is electrically connected to a power source 140. When switch 138 is closed, as, for example, when a sheet of print media is "picked" by print media feed rollers 96, power is supplied to LED 128 via power source 140 to produce a light signal 142. When switch 138 is open, no power is supplied to LED 128 and, as a consequence, no light signal is produced. Switch 138 is configured to be normally open so no light signal is produced. Switch 138 may be closed during "picking" of a sheet of print media by, for example, controller 40. Alternatively, switch 138 may be positioned in input supply feed tray so that it closes during "picking" by physical contact between switch 138 and the "picked" sheet of print media.

As can also be seen in FIG. 4, sensor 92 includes a phototransistor 144 having a collector 146 electrically connected to pull-up resistor 152 and an emitter 150 electrically connected to ground 148. Pull-up resistor 152 is also electrically connected to power source 154. Although a different power source 154 is shown for sensor 92 than for source 90, it is to be understood that in other embodiments of the present invention, source 90 and sensor 92 may use the same power source. Collector 146 of phototransistor 144 is also electrically connected to printer controller 40 via terminal 157. Phototransistor 144 is configured to not conduct current to ground 148 through pull-up resistor 152 in the absence of a predetermined value of light. Once this value is sensed at phototransistor 144, it conducts current to ground 148, producing a voltage drop across pull-up resistor 152 which produces an electrical signal at terminal 157 that is received by printer controller 40. The resistance of phototransistor 144 is configured to decrease as the magnitude of light illuminating it increases. As the resistance of phototransistor 144 decreases, the amount of current through pull-up resistor 152 increases, producing a greater voltage drop across pull-up resistor 152 and a lower magnitude electrical signal at terminal 157.

As can additionally be seen in FIG. 4, sheet of print media 126 includes a substrate 127 having a first surface 156 shown facing source 90. Substrate 127 also includes a second surface (not shown) opposite of first surface 156 and facing sensor 92. Sheet of print media 126 defines a set of a plurality of apertures 158 that extend through both first surface 156 and the second surface. Set of apertures 158 is configured to encode data representative of one or more characteristics of sheet of print media 126, as discussed above.

As can be further seen, set of apertures 158 encodes this data in several ways. First, each aperture has a substantially circular shape. Second, set of apertures 158 is arranged in subsets of apertures 162, 164, 166, 168, 170, and 172 that extend along edge 160 of sheet 126. In the embodiment of print media sheet 126 shown there are three subsets: one of three apertures, another of three apertures, and one of two apertures. Third, two offset columns of apertures 174 and 176 are formed: one column by subsets 162, 164, 166 and another column by subsets 168, 170, and 172. Such offsetting has also been found to help further minimize the visual perceptibility of columns of apertures 174 and 176. Use of multiple columns of apertures, like columns of apertures 174 and 176, whether offset or not, has also been found to increase robustness of operation of the present invention by helping to correct for print media skew problems during "picking" and transport by print media handling system 26 caused by user error in loading print media in input supply feed tray 28.

Additional sets of apertures 178, 180, 182, 184, 186, 188, and 190 defined by sheet of print media 126 are also shown. These apertures may be different or identical to set of apertures 158 depending on the number of different correct printing orientations for sheet 126.

In operation, a sheet of print media of the present invention, such as sheet 126, is "picked" by print media feed rollers 96 and transported to printzone 25, as generally indicated by arrow 192 in FIG. 4. As set of apertures 158 passes between source 90 and sensor 92, switch 138 of source 90 is closed so that current is conducted to ground 132 through LED 128 which produces light signal 142. Light signal 142 passes through each of the apertures of column of apertures 174 or column of apertures 176 and triggers phototransistor 144 to conduct, producing a voltage waveform shown in FIG. 5. Once set of apertures 158 passes though print media detector 86, light signal 142 is reflected off first surface 156 so that phototransistor 144 no longer conducts current. Switch 138 is then opened so that LED 128 no longer produces light signal 142.

Figure 5:
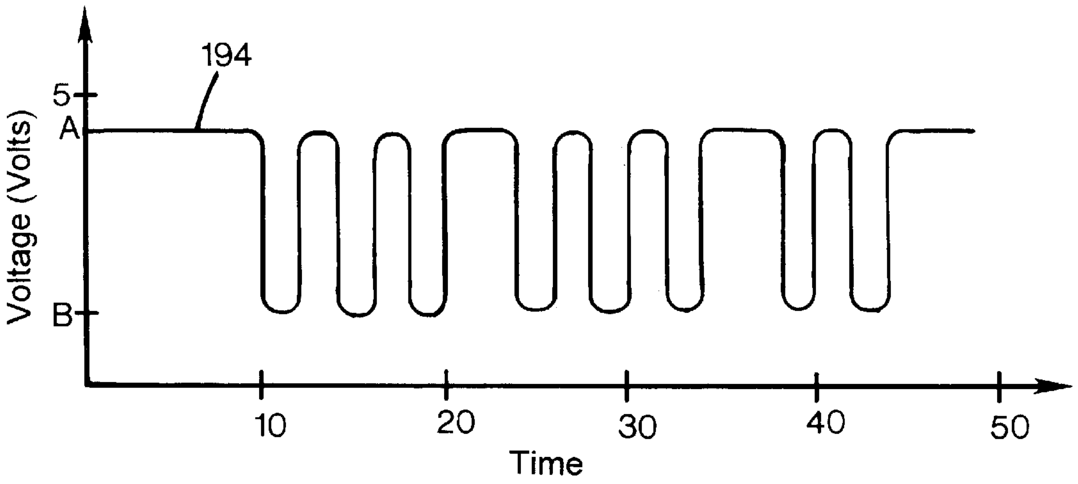
FIG. 5 is a diagram of a voltage output waveform at a sensor of the embodiment the print media detector shown in FIGS. 1–4 for the sheet of print media shown in FIGS. 2–4.

A diagram of a voltage output waveform at terminal 157 of sensor 92 versus time as sheet of print media 126 passes through print media detector 86 during a period of a little under fifty (50) milliseconds is shown in FIG. 5. For a power source 154 of 5 volts, voltage signal 194 represents the output voltage at terminal 157 as a function of time with LED 128 of source 90 producing light signal 142 between a time just before ten (10) milliseconds and up to just before fifty (50) milliseconds. The periods where voltage signal 194 drops below the higher voltage level A to the lower voltage level B occur during those times when light signal 142 travels from LED 128 of source 90 through one or more of the apertures of set 158 to phototransistor 144 of sensor 92. The periods where voltage signal 194 is near five (5) volts at voltage level A occur during those times when light signal 142 is reflected from first surface 156 or print media sheet 126. For example, the period substantially between ten (10) and twenty (20) milliseconds on voltage signal 194 where the voltage drops below the higher voltage level A to the lower voltage level B occurs when light signal 142 passes through one of the apertures in either subset of apertures 162 or subset of apertures 168. Printer controller 40 is configured to receive signal 194 and, based at least in part on signal 194, control one or more operating parameters of printing device 20.

Figure 6:
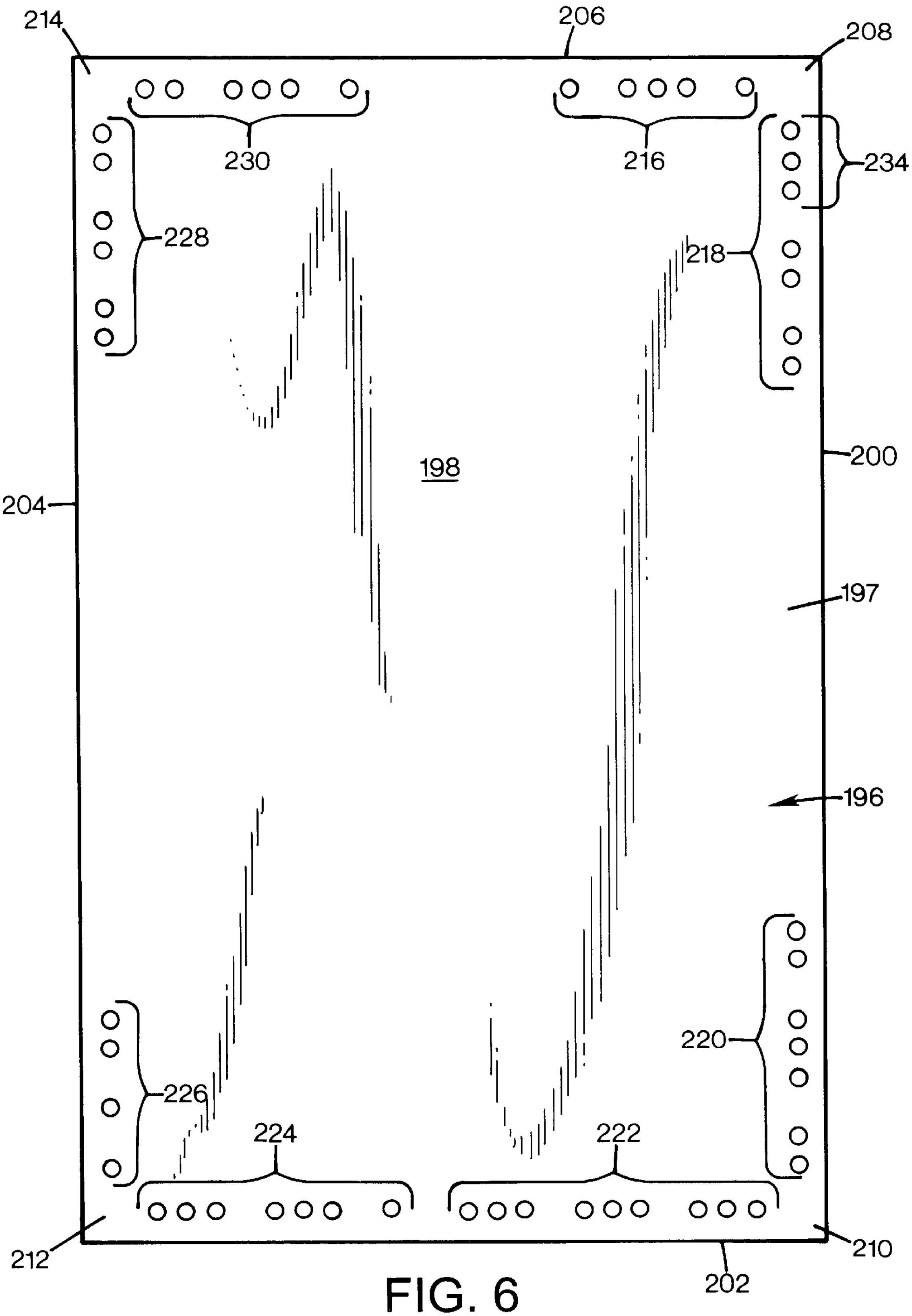
FIG. 6 is an exemplary alternative embodiment of a print medium of the present invention.

An alternative embodiment of a print medium 196 constructed in accordance with the present invention is shown in FIG. 6. Print medium 196 includes a substrate 197 having a first surface 198 and an opposite second surface (not shown). Print medium 196 also includes edges 200, 202, 204, and 206, pairs of which intersect to form corners 208, 210, 212, and 214, as shown. Sets of apertures 216, 218, 220, 222, 224, 226, 228, and 230 are defined by print medium 196 and extend between first surface 198 and the second surface. Sets of apertures 216, 218, 220, 222, 224, 226, 228, and 230 are configured to encode data representative of one or more characteristics of print medium 196. As can be seen in FIG. 6, each of the apertures has a substantially circular shape and each set of apertures 216, 218, 220, 222, 224, 226, 228, and 230 is arranged in a different pattern. The patterns are different so that printer controller 40 and print media detector 86 can determine the orientation of print medium 196 in printzone 25 and make adjustments based on this orientation (e.g., print in landscape mode instead of portrait mode) or inform a user of printing device 20 of any improper orientation so that neither print medium 196 nor user time are not wasted.

Figure 7:
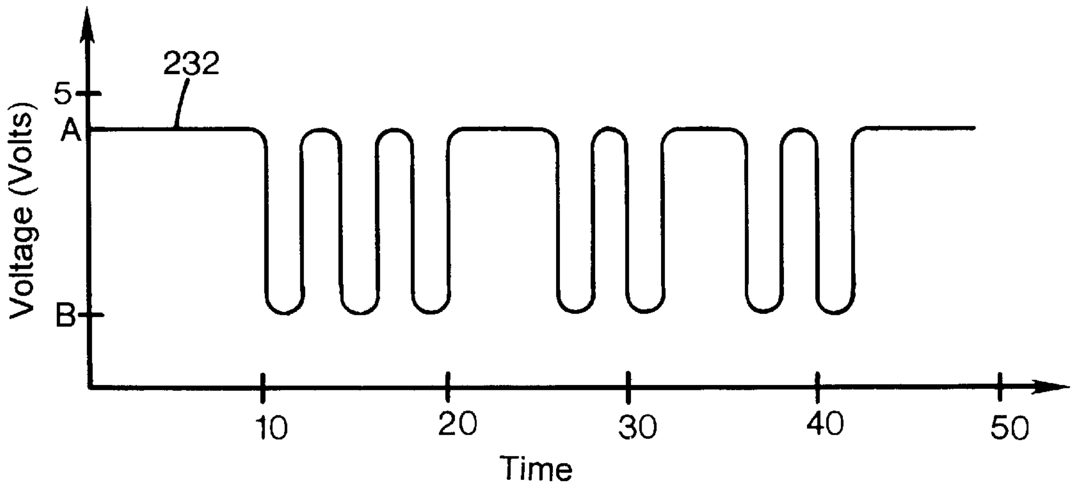
FIG. 7 is a diagram of a voltage output waveform at the sensor of the embodiment of the print media detector shown in FIGS. 1–4 for a set of apertures defined by the print medium shown in FIG. 6.

A diagram of a voltage output waveform at terminal 157 of sensor 92 versus time as set of apertures 218 of print medium 196 pass through print media detector 86 during a period of a little under fifty (50) milliseconds is shown in FIG. 7. For a power source 154 of 5 volts, voltage signal 232 represents the output voltage at terminal 157 as a function of time with LED 128 of source 90 producing light signal 142 between a time just before ten (10) milliseconds and up to just before fifty (50) milliseconds. The periods where voltage signal 194 drops below the higher voltage level A to the lower voltage level B occur during those times when light signal 142 travels from LED 128 of source 90 through one or more of the apertures of set 218 to phototransistor 144 of sensor 92. The periods where voltage signal 194 is near five (5) volts at voltage level A occur during those times when light signal 142 is reflected from first surface 198 of print media sheet 126. For example, the period substantially between ten (10) and twenty (20) milliseconds on voltage signal 232 where the voltage drops below the higher voltage level A to the lower voltage level B three times occurs when light signal 142 passes through the apertures in subset of apertures 234. Printer controller 40 is configured to receive signal 232 and, based at least in part on signal 232, control one or more operating parameters of printing device 20.

Figure 8:
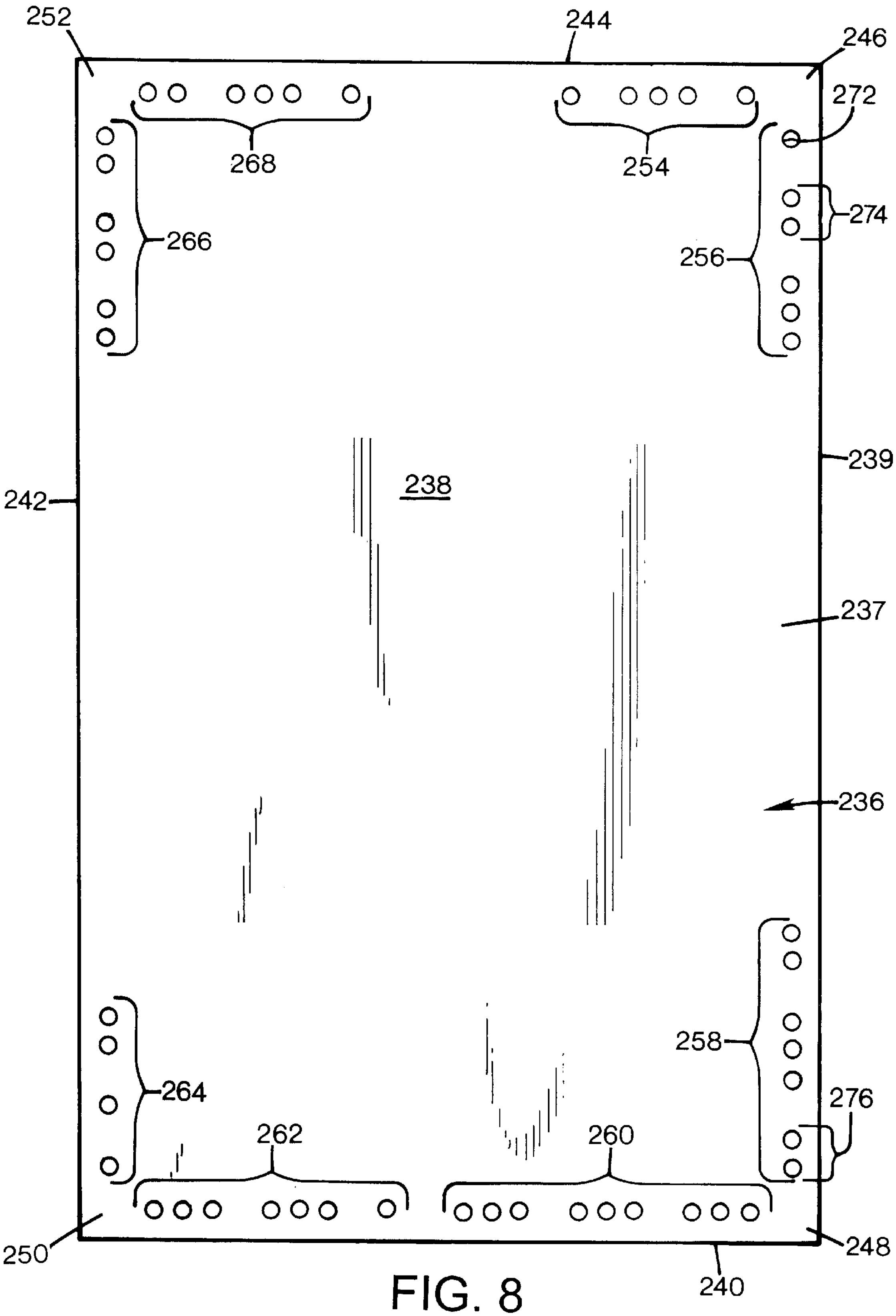
FIG. 8 is another exemplary alternative embodiment of a print medium of the present invention.

Another alternative embodiment of a print medium 236 constricted in accordance with the present invention is shown in FIG. 8. Print medium 236 includes a substrate 237 having a first surface 238 and an opposite second surface (not shown). Print medium 236 also includes edges 239, 240, 242, and 244, pairs of which intersect to form corners 246, 248, 250, and 252, as shown. Sets of apertures 254, 256, 258, 260, 262, 264, 266, and 268 are defined by print medium 236 and extend between first surface 238 and the second surface. Sets of apertures 254, 256, 258, 260, 262, 264, 266, and 268 are configured to encode data representative of one or more characteristics of print medium 236. As can be seen in FIG. 8, each of the apertures has a substantially circular shape and each set of apertures 254, 256, 258, 260, 262, 264, 266, and 268 is arranged in a different pattern. The patterns are different so that printer controller 40 and print media detector 86 can determine the orientation of print medium 236 in printzone 25 and make adjustments based on this orientation (e.g., print in landscape mode instead of portrait mode) or inform a user of printing device 20 of any improper orientation so that neither print medium 236 nor user time are not wasted.

Figure 9:
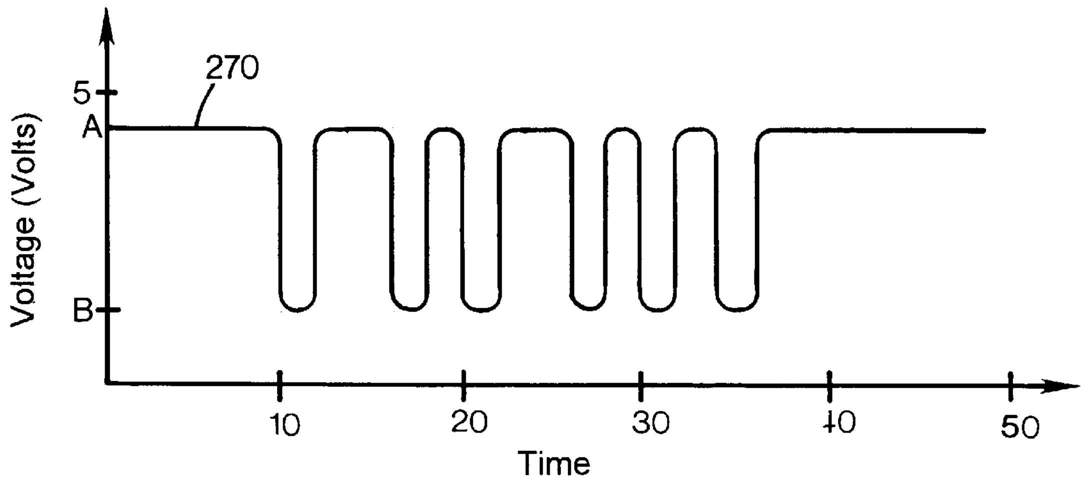
FIG. 9 is a diagram of a voltage output waveform at the sensor of the embodiment of the print media detector shown in FIGS. 1–4 for a set of apertures defined by the print medium shown in FIG. 8.

A diagram of a voltage output waveform at terminal 157 of sensor 92 versus time as set of apertures 256 of print medium 236 pass through print media detector 86 during a period of a little under fifty (50) milliseconds is shown in FIG. 9. For a power source 154 of 5 volts, voltage signal 270 represents the output voltage at terminal 157 as a function of time with LED 128 of source 90 producing light signal 142 between a time just before ten (10) milliseconds and up to just before fifty (50) milliseconds. The periods where voltage signal 270 drops below the higher voltage level A to the lower voltage level B occur during those times when light signal 142 travels from LED 128 of source 90 through one or more of the apertures of set 256 to phototransistor 144 of sensor 92. The periods where voltage signal 270 is near five (5) volts at voltage level A occur during those times when light signal 142 is reflected from first surface 238 of print media sheet 126. For example, the period substantially between ten (1) and twenty-five (25) milliseconds on voltage signal 270 where the voltage drops below the higher voltage level A to the lower voltage level B three times occurs when light signal 142 passes through aperture 272 and the apertures in subset of apertures 274. Printer controller 40 is configured to receive signal 270 and, based at least in part on signal 270, control one or more operating parameters of printing device 20.

Figure 10:
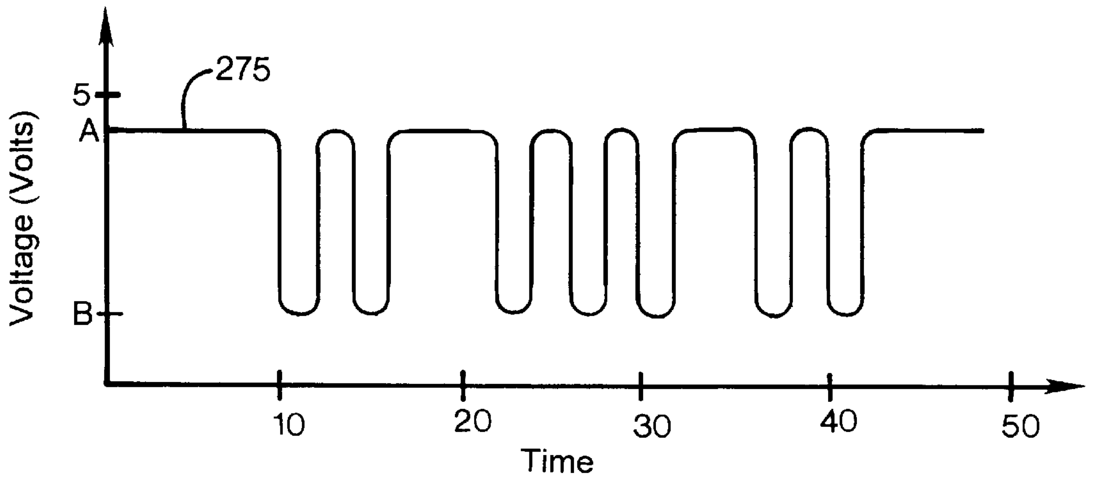
FIG. 10 is a diagram of a voltage output waveform at the sensor of the embodiment of the print media detector shown in FIGS. 1–4 for a different set of apertures defined by the print medium shown in FIG. 8.

A diagram of a voltage output waveform at terminal 157 of sensor 92 versus time as set of apertures 258 of print medium 36 pass through print media detector 86 during a period of a little under fifty (50) milliseconds is shown in FIG. 10. For a power source 154 of 5 volts, voltage signal 275 represents the output voltage at terminal 157 as a function of time with LED 128 of source 90 producing light signal 142 between a time just before ten (10) milliseconds and up to just before fifty (50) milliseconds. The periods where voltage signal 275 drops below the higher voltage level A to the lower voltage level B occur during those times when light signal 142 travels from LED 128 of source 90 through one or more of the apertures of set 258 to phototransistor 144 of sensor 92. The periods where voltage signal 275 is near five (5) volts at voltage level A occur during those times when light signal 142 is reflected from first surface 238 of print media sheet 236. For example, the period substantially between ten (10) and twenty (20) milliseconds on voltage signal where the voltage drops below the higher voltage level A to the lower voltage level B two times occurs when light signal 142 passes through apertures in subset of apertures 276. Printer controller 40 is configured to receive signal 275 and, based at least in part on signal 275, control one or more operating parameters of printing device 20.

As can be seen by comparing FIGS. 9 and 10, voltage signal 270 differs from voltage signal 275 even though both are generated as a result of "picking" of print medium 236 by print media feed rollers 96. The differences result from orienting print medium 236 differently in input supply feed tray 28 of print media handling system 26. These differences may or may not matter depending on the type of print medium and the print job. If these different print medium orientations do matter, controller 40 can pause printing and signal the user of printing device 20 to properly orient print medium 236 in input supply feed tray 28 before beginning printing or controller 40 can adjust printing by printing device 20 for the particular orientation, thereby avoiding waste of print medium 236, as well as waste of time.

Although the invention has been described and illustrated in detail, it is to be clearly understood that the same is intended by way of illustration and example only, and is not to be taken necessarily, unless otherwise stated, as an express limitation. For example, although print media detector 86 is shown attached to sidewall 88 or print media handing system 26, other locations are possible. For example, in alternative embodiments of the present invention, print media detector 86 may be located on input supply feed tray 28. As another example, although apertures have been shown as being configured to have a geometry that is substantially circular, it is to be understood that other shapes (e.g., substantially rectangular, triangular, elliptical, etc.) are within the scope of the present invention. In addition, although specific diameter ranges have been given for the apertures, it is to be understood that other size ranges that still allow detection by print media detector 86 while minimizing or eliminating visual perceptibility are within the scope of the present invention. Further, the size of identically shaped apertures (e.g., circular) may be configured to be different. These different sized apertures encode additional data representative of one or more characteristics of a print medium by affecting the magnitude of a light signal passing through them differently. As a further example, columns of apertures, like those shown in FIG. 4, need not be identical, but rather may have a different pattern for each column. Additionally, columns of apertures, like those shown in FIG. 4, need not be offset from one another. As yet a further example, the apertures of the present invention may be placed in locations other than as shown in the drawings above. For example, apertures may be defined in a repeating pattern over a portion or all of the area of a sheet of print media like patterns that appear in wallpaper. Such patterning allows encoded data on a sheet of print media to be detected no matter how the sheet of print media is oriented in an input supply feed tray of a print media handling system. As still yet a further example, the print media detector may be an air-type detector rather than and optical-type detector, as shown in the drawings. Such an air-type detector could include as a source an air nozzle directed toward a sheet of "picked" print media. Air from such an air nozzle would penetrate apertures and be deflected from the sheet of print media where no apertures were present. A sensor of the air-type detector would be configured to detect air penetrating any apertures defined by the print media and generate a corresponding electrical signal for use by the printer controller. The spirit and scope of the present invention are to be limited only by the terms of the following claims.

What is claimed is:

1. Cut sheet type print media for use in a printing device, the print media comprising:

individually printable units of media, each said unit having a substrate configured to receive a printing composition from the printing device, the substrate including a printable first surface, wherein at least the first surface of the substrate is configured to receive the printing composition from the printing device during printing, and further wherein the first surface of the substrate has a characteristic, the substrate surface further configured to define at least one aperture, the at least one aperture having a geometry configured to encode data representative of the characteristic of the first surface, wherein the geometry is configured for minimizing visual perceptibility of the at least one aperture.

2. The print medium of claim 1, in a print media detection system.

3. The print medium of claim 1, wherein the geometry includes one of a substantially circular opening, a substantially rectangular opening, a substantially triangular opening, and a substantially elliptical opening.

4. The print medium of claim 3, comprising:

print medium having the at least one aperture having the geometry as said substantially circular opening wherein the substantially circular opening has a diameter substantially within a range between 0.001 inches and 0.008 inches.

5. The print medium of claim 1, wherein the substrate includes an edge and further wherein the substrate defines the at least one aperture adjacent the edge.

6. The print medium of claim 1, wherein the substrate defines the at least one aperture in a predetermined location on the print medium, and further wherein the location of the aperture encodes additional data representative of the characteristic of the first surface.

7. The print medium of claim 1, wherein the substrate defines at least two apertures, wherein the at least two apertures are arranged in a pattern, and further wherein the pattern encodes additional data representative of the characteristic of the first surface.

8. The print medium of claim 1, in a printing device.

9. A print media detection system for use in a printing device, the print media detection system comprising:

a source configured to transmit a light signal;

a sensor configured to detect the light signal from the source and convert the light signal into an electrical signal;

a controller coupled to the sensor, the controller configured to receive the electrical signal from the sensor and based at least in part on the electrical signal control an operating parameter of the printing device; and individually printable units of media, each said unit having a substrate having a printable surface configured to receive a printing composition from the printing device, the substrate having at least one characteristic and the substrate further configured to define a plurality of apertures through the printable surface, the apertures each having a geometry selected to allow the light signal to travel from the source through the apertures to the sensor and the apertures being arranged in a pattern that encodes data representative of the characteristic of the substrate, wherein the geometry of each of the apertures is configured for minimizing visual perceptibility of the apertures.

10. The print media detection system of claim 9, in a printing device.

11. The print media detection system of claim 9, wherein the plurality of apertures are in a predetermined location on the substrate, and further wherein the location of the apertures encodes additional data representative of the characteristic of the first surface.

12. The print media detection system of claim 9, wherein the geometry includes one of at least one substantially circular opening, at least one substantially rectangular opening, at least one substantially triangular opening, and at least one substantially elliptical opening.

13. The print media detection system of claim 12, comprising:

print medium having the at least one aperture having the geometry as said substantially circular opening wherein the substantially circular opening has a diameter substantially within a range between 0.001 inches and 0.008 inches.

14. A print media detection system for use in a printing device, the print media detection system comprising:

means for transmitting a light signal;

means for sensing the light signal and converting the light signal into an electrical signal;

means coupled to the means for sensing for controlling an operating parameter of the printing device based at least in part on the electrical signal received from the means for sensing; and means for receiving printing composition from the printing device wherein said means for receiving printing composition may be printed from border-to-border, the means for receiving printing composition having at least one characteristic and the means for receiving printing composition defining means for encoding data representative of the characteristic.

15. The print media detection system of claim 14, in a printing device.

16. The print media detection system of claim 14, wherein the means for receiving printing composition includes a substrate, and further wherein the means for encoding data representative of the characteristic includes a plurality of apertures, the apertures each having a geometry selected to allow the light signal from the means for transmitting to travel from the means for transmitting through the apertures to the means for sensing and the apertures being arranged in a pattern that encodes data representative of the characteristic of the substrate.

17. The print media detection system of claim 14, wherein the means for receiving printing composition includes a substrate having a first surface, wherein at least the first surface of the substrate is configured to receive the printing composition from the printing device during printing, and further wherein the first surface of the substrate has a characteristic, and further wherein the means for encoding data representative of the characteristic includes at least one aperture through which the light signal from the means for transmitting passes to the means for sensing.

18. A method of detecting a characteristic of a substrate of print medium used in a printing device, the substrate of print medium having a characteristic and being configured to receive a printing composition from the printing device, the method comprising:

encoding data into the printable regions of the substrate of print medium, the data representing the characteristic of the substrate of print medium;

transmitting a light signal through the encoded data in the substrate of print medium;

detecting the light signal subsequent to transmission through the encoded data in the substrate of print medium;

converting the detected light signal into an electrical signal, the electrical signal having a pattern representative of the characteristic of the print medium; and controlling an operating parameter of the printing device based at least in part on the electrical signal.

19. The method of claim 18, wherein the data is encoded into the substrate as a plurality of apertures.

20. The method of claim 18, wherein the data is encoded into the substrate as at least one aperture.

21. The method of claim 20, wherein the at least one aperture includes one of a substantially circular opening, a substantially rectangular opening, a substantially triangular opening, and a substantially elliptical opening.

22. The method of claim 20, further comprising configuring a geometry of the at least one aperture to encode data representative of the characteristic of the substrate of print medium.

23. The method of claim 22, further comprising configuring the geometry of the at least one aperture for minimizing visual perceptibility of the at least one aperture.

24. The method of claim 21, comprising:

print medium having the at least one aperture having the geometry as said substantially circular opening wherein the substantially circular opening has a diameter substantially within a range between 0.001 inches and 0.008 inches.

25. The method of claim 19, further comprising configuring a geometry of the apertures to encode data representative of the characteristic of the substrate of print medium.

26. The method of claim 25, further comprising configuring the geometry of the apertures for minimizing visual perceptibility of the apertures.

27. The method of claim 25, wherein the geometry includes at least one substantially circular opening.

28. The method of claim 25, further comprising arranging the apertures in a pattern that encodes additional data representative of the characteristic of the substrate.

29. The method of claim 25, wherein the substantially circular opening has a diameter substantially within a range between 0.001 inches and 0.008 inches.

30. A print medium for use in a printing device, the print medium comprising:

a substrate configured to receive a printing composition from the printing device, the substrate including a first surface that is printable and a plurality of corners defined by intersecting edges of the substrate, wherein at least the first surface of the substrate is configured to receive the printing composition across its entirety from the printing device during printing, and further wherein the first surface of the substrate has a characteristic, the substrate further configured to define a plurality of sets of apertures, at least one set of apertures positioned adjacent each of the corners and one set of apertures having a configuration indicative of the characteristic of the substrate.

31. The print medium of claim 30, in a printing device.

32. The print medium of claim 30, in a print media detection system.

33. The print medium of claim 30, wherein the configuration includes a pattern that encodes data representative of the characteristic of the first surface.

34. The print medium of claim 30, wherein the configuration includes a geometry that encodes data representative of the characteristic of the first surface.

35. The print medium of claim 30, wherein the sets of apertures include one of a substantially circular opening, a substantially rectangular opening, a substantially triangular opening, and a substantially elliptical opening.

36. The print medium of claim 35, comprising:

print medium having the at least one aperture having the geometry as said substantially circular opening wherein the substantially circular opening has a diameter substantially within a range between 0.001 inches and 0.008 inches.

37. The print medium of claim 30, wherein the apertures are configured for minimizing visual perceptibility.

* * * * *